United States Patent [19]

Kaufman

[11] 4,436,890

[45] Mar. 13, 1984

[54] AROMATIC UREA-BASED CURING AGENT SYSTEM FOR EPOXY RESIN COATING COMPOSITIONS

[75] Inventor: Marvin L. Kaufman, Bridgewater, N.J.

[73] Assignee: Mobil Oil Corporation, New York, N.Y.

[21] Appl. No.: 454,787

[22] Filed: Dec. 30, 1982

[51] Int. Cl.³ .................... C08G 59/44; C08G 59/68
[52] U.S. Cl. .................... 528/93; 523/400; 523/435; 523/454; 523/456; 525/327.3; 525/504; 528/73; 528/89; 528/92; 528/119; 528/367; 528/368
[58] Field of Search ........... 528/73, 89, 92, 93, 528/119, 367, 368; 525/327.3, 504; 523/400, 435, 454, 456

[56] References Cited

U.S. PATENT DOCUMENTS

| | | |
|---|---|---|
| 3,294,749 | 12/1966 | Pratt .................... 528/93 X |
| 3,386,956 | 6/1968 | Nawakowski et al. .......... 528/119 |
| 3,759,914 | 9/1973 | Simms et al. .................... 528/93 X |
| 3,945,971 | 3/1976 | Harrison et al. .................... 528/93 |
| 3,956,237 | 5/1976 | Doorakian et al. .................... 528/93 |
| 3,988,257 | 10/1976 | Harrison et al. .................... 528/122 X |
| 4,110,309 | 8/1978 | Schulze et al. .................... 528/119 |
| 4,141,885 | 2/1979 | Waddill .................... 528/111 X |

*Primary Examiner*—Earl A. Nielsen
*Attorney, Agent, or Firm*—Alexander J. McKillop; Michael G. Gilman; James P. O'Sullivan, Sr.

[57] ABSTRACT

Single package, thermosetting epoxy resin-based coating compositions are provided which contain a polyepoxide and a curing agent system therefor which comprises an aromatic urea. At composition curing times and temperatures, the aromatic urea reacts with a portion of the polyepoxide to thereby form in situ a primary or secondary amine which can then function as a coreactive curing agent to complete the cure of the epoxy resin coating.

25 Claims, No Drawings

AROMATIC UREA-BASED CURING AGENT SYSTEM FOR EPOXY RESIN COATING COMPOSITIONS

BACKGROUND OF THE INVENTION

1. Field of the Invention

The present invention relates to stable, thermosetting coating compositions containing polyepoxide resins and a particular type of aromatic urea-based curing agent system therefor.

2. Description of the Prior Art

Polyepoxides, also known as epoxy resins, are a broad class of organic compounds containing the vicinal epoxy or oxirane structure:

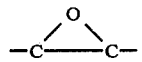

Polyepoxides are in widespread commercial use as adhesives, castings, surface coatings, electrical insulation and the like. The polyepoxides are not thermosetting when pure, but reaction in the presence of a so-called curing agent can convert them into a resinified, crosslinked, polymeric thermoset plastic.

The primary or secondary amine type of coreactive curing agents, such as diethylene triamine, are extremely fast-acting when used in conjunction with polyepoxide. Once such coreactive curing agents have been introduced into the polyepoxide, the batch must be used immediately, or the resin will harden in production equipment and upon tools. Thus, to obviate waste, the admixture of resin and amine type coreactive curing agents cannot exceed the quantity which is capable of being utilized rapidly.

Attempts have been made to formulate single package, stable polyepoxide-based coating compositions which employ so-called "latent" curing systems. For example, Simms et al; U.S. Pat. No. 3,759,914; issued Sept. 18, 1973 and Pratt; U.S. Pat. No. 3,294,749; issued Dec. 27, 1966, both disclose polyepoxide compositions employing latent curing agents such as particular amine compounds and polycarboxylic acid anhydrides. The curing agents used in the systems of these two patents both require the presence of an additional material such as urea-type compounds which function at elevated temperatures as accelerators for the curing agents in promoting the curing of the polyepoxide resin.

Notwithstanding the existence of coating compositions employing latent curing agents and accelerators therefor, there is a continuing need to develop additional types of stable, single package polyepoxide-containing coating compositions. Such compositions are those which employ fast-acting primary and secondary amines as coreactive curing agents for the polyepoxide resin at elevated curing temperatures but which are substantially free of coreactive amounts of such curing agents when the compositions are maintained at room temperature.

SUMMARY OF THE INVENTION

In accordance with the present invention, coating compositions, in either solution or powder form, are provided containing a curing agent system which generates coreactive amounts of primary or secondary amine curing agents when such compositions are subjected to curing conditions including a temperature of at least about 70° C. Such compositions consist essentially of a polyepoxide resin, an aromatic urea containing an

moiety, and a condensation-type catalyst suitable for promoting reaction at temperatures of at least about 70° C. of the aromatic urea with a portion of the polyepoxide. The polyepoxide resin has an epoxy equivalency greater than 1.0. The aromatic urea is present in an amount sufficient to provide an effective amount of a coreactive amine curing agent for the polyepoxide when, upon heating of the composition, the urea reacts with a portion of the polyepoxide to produce a polyoxazolidone resin and a primary or secondary amine useful as the curing agent. At temperatures below about 70° C., the coating compositions herein are substantially free of coreactive amounts of amine and polycarboxylic acid anhydride curing agents.

DETAILED DESCRIPTION OF THE INVENTION

Polyepoxides are employed as the essential coating film-forming agent in the coating compositions of the present invention. Polyepoxides comprise organic materials having a plurality of reactive 1,2-epoxy groups. These polyepoxide materials can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like.

A widely used class of polyepoxides which can be catalyzed according to the practice of the present invention encompasses the resinous epoxy polyethers obtained by reacting an epihalohydrin, such as epichlorohydrin, epibromohydrin, epiiodihydrin, and the like, with either a polyhydric phenol or a polyhydric alcohol.

Among the polyhydric phenols which can be used in preparing these resinous epoxy polyethers are dihydric phenols represented by the general formula:

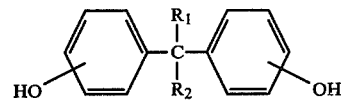

wherein the phenolic hydroxy groups may be in one of the 2,2'; 2,3'; 2,4'; 3,3'; 3,4'; or 4,4' positions on the aromatic nuclei, and each of $R^1$ and $R^2$ represent hydrogen, an alkyl group, such as methyl, ethyl, propyl, isopropyl, butyl, sec-butyl, tert-butyl, pentyl, isopentyl, hexyl, isohexyl, and the like, a cyclo (lower)-alkyl group such as a cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl, and the like. In addition, the phenolic rings may have other substituents besides the hydroxyl group, for example, lower alkyl groups containing from one to four carbon atoms, i.e., methyl, ethyl, propyl, isopropyl, butyl, sec-butyl, and tert-butyl groups, halogen atoms, i.e., fluorine, chlorine, bromine or iodine, and the like.

An illustrative but, by no means exhaustive listing of dihydric phenols falling within this general formula includes
4,4'-dihydroxydiphenyldimethylmethane (bisphenol A),
2,4'-dihydroxydiphenylethylmethane,
3,3'-dihydroxydiphenyl-diethylmethane,
3,4'-dihydroxydiphenylmethylpropylmethane,
2,3'-dihydroxydiphenylethylphenylmethane,
4,4'-dihydroxy-diphenylpropylphenylmethane,
4,4'-dihydroxydiphenylbutylphenylmethane,
2,2'-dihydroxydiphenylditolylmethane,
4,4'-dihydroxydiphenyltolylmethylmethane, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl) dimethylmethane, 1,4-dimethylolbenzene, glycerol, 1,2,6-hexanetriol, trimethylol propane, mannitol, sorbitol, erythritol, pentaerythritol, their dimers, trimers and high polymers, e.g., polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2'2',3,3'-tetrahydroxydipropyl sulfide and the like, mercapto alcohols such as alpha-monothioglycerol, alpha, alpha'-dithioglycerol, and the like, polyhydric alcohol partial esters such as monostearin, pentaerythritol monoacetate and the like, and halogenated polyhydric alcohols such as the monochlorodrins of glycerol, sorbitol, pentaerythritol and the like.

The polyepoxide resins prepared by reacting epihalohydrin and polyhydric phenol or polyhydric alcohol may contain free terminal hydroxyl groups or terminal hydroxyl groups and terminal epoxy groups, and will vary in molecular weight depending on the reactants employed in the preparation, the relative amounts thereof, and the extent to which the reaction is carried out. These thermosetting epoxy resinous materials are generally soluble in solvents such as acetone, methyl ethyl ketone, methyl isobutyl ketone, cyclohexanone, and the like. Polyepoxides of these types are frequently glycidyl ethers of bisphenol A and are commercially available under such tradenames as EPON 828, EPON 825 and DER 663U.

A related class of polymeric polyepoxides which can be used in the coating compositions of the present invention comprises the polyepoxypolyhydroxy polyethers obtained by reacting, again preferably in alkaline medium a polyhydric phenol such as bisphenol A, resorcinol, cathechol and the like.

Another class of polymeric polyepoxides which can be used in the coating compositions of the present invention includes the epoxy novolac resins obtained by reacting, preferably, in the presence of a basic catalyst, e.g., sodium or potassium hydroxide, and epihalohydrin such as epichlorohydrin with the resinous condensate of an aldehyde, e.g., formaldehyde, and either a monohydric phenol, e.g., phenol itself, or a polyhydric phenol, e.g., bisphenol A.

Still another class of polymeric polyepoxides which can be used in the compositions of the present invention includes polymers, i.e., homopolymers and copolymers, of epoxy-containing monomers which also contain at least one polymerizable double bond. Such monomers can be polymerized through their double bonds in known manner, e.g., in bulk or in solution in an inert organic solvent such as benzene and the like, preferably by heating in the presence of oxygen or a peroxide catalyst but, in the absence of alkaline or acidic catalysts, leaving the epoxy groups unaffected and, therefore, regularly or randomly dispersed along the polymer chains. Among such ethylenically unsaturated epoxy-containing monomers are vinyl 2,3-glycidyl ether, allyl 2,3-glycidyl ether, methallyl, 2,3-glycidyl ether, methallyl 3,4-epoxybutyl ether, glycidyl acrylate, glycidyl methacrylate, 2,3-epoxypropyl crotonate, vinyl cyclohexane monoxide, 4-glycidyloxystyrene, and the like. Suitable comonomers for copolymerization with these ethylenically unsaturated epoxy-containing monomers include styrene, acrylonitrile, methacrylonitrile, methyl acrylate, ethyl acrylate, methyl methacrylate, vinyl chloride, vinylidene chloride, vinyl acetate, diallyl phthalate, and the like.

Still another class of polyepoxides which can be employed in the coating compositions herein include the epoxy-terminated polyoxazolidones. Epoxy-terminated polyoxazolidones can be prepared by reacting diepoxides with a diisocyanate under conditions which form the polyoxazolidone resin. The diepoxide reactant used in polyoxazolidone formation can be the diepoxide form of any of the polyepoxides hereinbefore described. The diisocyanate reactant can be any of the diisocyanates as described hereinafter as useful for the preparation of the aromatic urea component of the compositions herein. Epoxy-terminated polyoxazolidone resins of the type useful herein result when the ratio of epoxide to isocyanate equivalents provided by the diepoxide and diisocyanate reactants ranges from about 10:1 to 11:1. Such polyoxazolidone resins have molecular weights which provide weight per epoxy (WPE) values for the polyoxazolidone which range from about 250 to 4000, more preferably from about 400 to 1000. Polyoxazolidone resins which are useful in the present invention are described more fully in the concurrently filed U.S. patent application of Marvin L. Kaufman, Ser. No. 454,790, which application is incorporated herein by reference.

Many of the polyepoxides hereinbefore described can be conveniently referred to in terms of epoxy equivalency, i.e., the average number of epoxy groups per molecule in the polyepoxide material. Where the polyepoxide is monomeric and all of its epoxy groups are intact, its epoxy equivalency will be represented by an integer, usually 2 or greater. However, where the polyepoxide is polymeric its epoxy equivalency will usually be represented by a fractional value of at least about 1.0 or greater, e.g., 1.5, 1.8, 2.3, and the like, since the polymer will usually contain molecules of different molecular weight and can also contain some monomeric polyepoxide or have some of its epoxy groups defunctionalized or otherwise reacted. Many of the polyepoxides useful in the present invention are described more fully in Simms et al.; U.S. Pat. No. 3,759,914; issued Sept. 18, 1973, the contents of which are incorporated herein by reference.

As indicated, polyepoxides are employed in the compositions herein as the coating film-forming agent. A portion or even all of the polyepoxide component can react with the aromatic urea as hereinafter described in order to liberate amine compounds which can then serve as coreactive curing agents for the remaining polyepoxide, and for the polyoxazolidone which is also produced by the polyepoxide/urea reaction. The polyepoxide component thus preferably comprises from about 70% to 99%, more preferably from about 75% to 95% by weight of the organic solids in the coating compositions herein, prior to curing.

A second essential component of the coating compositions herein comprises an aromatic urea curing agent precursor containing the moiety

The Ar group can be any mononuclear or polynuclear aromatic substrate such as phenyl, naphthyl, etc. and can be substituted or unsubstituted. Aromatic ureas of this type can be prepared by reacting an isocyanate with a primary or secondary amine. Thus such ureas may be produced by the reaction of an aromatic isocyanate with either aliphatic or aromatic amines. Alternatively, such ureas can be prepared by reaction of an aliphatic isocyanate with an aromatic amine. No matter which synthesis procedure is utilized, it is essential that the resulting urea material contain at least one

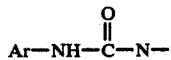

linkage.

The isocyanate materials useful in preparing the aromatic urea curing agent precursor can include any of the mono-, di-, or polyisocyanates known to the art. Thus, for example, the useful isocyanates may be materials of the general formula:

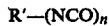

wherein R' is an organic residue comprising alkyl, substituted alkyl, aryl, substituted aryl, alkylene, substituted alkylene, arylene or substituted arylene and n is 1 to 3 or more. Examples of suitable isocyanates include phenyl isocyanate, tolylene diisocyanates (TDI) such as 2,4-tolylene diisocyanate, 2,6-tolylene diisocyanate, the methylene bis(phenyl isocyanates) (MDI) such as 4,4'-methylene bis(phenyl isocyanate), also dianisidine diisocyanate, toluidine diisocyanate, m-xylylene diisocyanate, 1,5-naphthylene diisocyanate, p-phenylene diisocyanate, 1,4-diethylbenzene, beta, beta'-diisocyanate, hexamethylene diisocyanate (HMDI), isophorone diisocyanate (IPDI), 4,4'-methylene bis(cyclohexylisocyanate) and other isocyanates known to the art. Mixtures of two or more of the above isocyanates can also be used, such as mixtures of 2,4- and 2,6-isomers of tolylene diisocyanate, mixtures of the 2,4'- and 4,4'-isomer of methylene bis(phenyl isocyanate) and the like. Preferred isocyanates are phenyl isocyanate, the tolylene diisocyanates, hexamethylene diisocyanate (HMDI) and the methylene bis(phenyl isocyanates) (MDI).

The primary or secondary amine materials useful in preparing the aromatic urea curing agent precursors herein can include any of the primary or secondary amine-type compounds or mixtures of primary and secondary amines known to be useful as coreactive curing agents for epoxy resins. Such suitable materials can include, for example, aliphatic primary and secondary monoamines containing up to about 15 carbon atoms including methylamine, ethylamine, propylamine, isopropylamine, butylamine, isobutylamine, sec-butylamine, tert-butylamine, amylamine, isoamylamine, sec-amylamine, tert-amylamine, hexylamine, heptylamine, diisopropylamine, dibutylamine, diisobutylamine, cyclohexylamine, and cycloheptylamine; aromatic amines such as aniline, ortho-, meta-, and paratoluidine, the xylidines, the phenylenediamines, N-methylaniline, N-ethylaniline, alpha-naphthylamine, beta-naphthylamine, pyridine and substituted pyridines and benzylamine; and polyamines such as alkylene diamines like ethylene diamine or polyalkylene polyamines such as diethylene triamine or triethylene tetra-amine. Also useful are polyamides and polyamidoamines which can have a plurality of terminal primary amine groups. Such polyamides and polyamidoamines can be prepared by amidation of a polycarboxylic acid with a polyamine and are available commercially under various tradenames such as Versamid, and Genamid.

The aromatic urea curing agents of the present invention can be prepared by simply admixing the isocyanate and amine materials as hereinbefore described to form the desired urea. Ordinarily, the reaction will take place at room temperature although some heating to a temperature of from about 30° C. to 150° C. may be employed. Preferably, stoichiometric amounts of the isocyanate and amine reactants are used to form the aromatic urea curing agents herein.

The particular aromatic ureas hereinbefore described are used in the coating compositions of the present invention as a precursor or source of coreactive amine curing agents for the polyepoxide resin. It is believed that under the coating composition curing conditions hereinafter described, and in the presence of a condensation-type catalyst as hereinafter described, the aromatic urea will react with a portion of the polyepoxide resin to form both a polyoxazolidone material and a primary or secondary amine. It is this primary or secondary amine material produced upon heating of the coating compositions during curing which then serves as a coreactive curing agent for the polyepoxide resin. Curing conditions which bring about this reaction include a temperature of at least about 70° C., more preferably at from about 90° C. to 250° C., and a curing time of at least about 0.1 minute, more preferably from about 0.2 to 60 minutes.

From the foregoing it can be seen that the particular aromatic urea materials of the present invention are generally used in the coating compositions herein in amounts sufficient to provide an effective amount of the coreactive amine curing agent upon reaction of the urea with a portion of the polyepoxide resin at temperatures above about 70° C. Generally such an effective amount of coreactive amine curing agent can be provided by utilizing an amount of aromatic urea which provides a ratio of equivalents of epoxide to equivalents of urea plus amine functionality of from about 0.2:1 to 2:1, more preferably a ratio of about 1:1.

A third essential component of the coating compositions herein is a condensation-type catalyst suitable for promoting the reaction of aromatic urea with a portion of the polyepoxide resin to produce a polyoxazolidone and the amine curing agent at temperatures of at least about 70° C. Such catalyst materials are those conventionally employed for reactions of this type and can include, for example, quaternary ammonium halides, lithium halides, lithium halide-phosphonium oxide complexes, n-butoxy lithium, dialkyl zinc, organozinc chelate compounds, trialkyl aluminum, dibutyltin dilaurate, tertiary amines such as adducts of hexamethylenediisocyanate and dimethylethanolamine and adducts of epoxy resins such as EPON 828 and dimethylamine, and the like. Quaternary ammonium halides such as tetraethylammonium bromide, and tertiary amines are the preferred catalysts for promoting the polyepoxide/urea reaction. The catalyst is advantageously employed in catalytic amounts which can generally range from about 0.1% to 10%, more preferably from about 1% to about 5%, based on the weight of the polyepoxide and aromatic urea reactants.

By utilizing the particular aromatic ureas and condensation-type catalysts of the present invention in polyepoxide resin-containing coating compositions, it is possible to formulate stable, heat curable coating products in a single package form. Such products are stable inasmuch as at temperatures below curing temperatures, e.g., below about 70° C., the polyepoxide-based coating compositions herein are substantially free of coreactive amounts of curing agents such as amines and polycarboxylic acid anhydrides. Upon heating of such compositions to curing temperatures of at least about 70° C., and preferably to within the range of from about 90° C. to 250° C. for a curing length of time, the catalytic reaction of urea with polyepoxide produces polyoxazolidone and an amine curing agent which then serves to effect the cure of the coating prepared from such a composition.

In formulating coating compositions based on the polyepoxide resins and aromatic ureas of the present invention, conventional coating composition adjuvants such as pigments, flow control agents and the like can be added. Thus, for example, one or more flow control agents can optionally be incorporated into the coating compositions of the present invention to aid in leveling the applied and thermoset coating, i.e., to help make the coating as smooth as or smoother than the surface of the uncoated substrate to which it is applied. Numerous flow control agents are known in the art and are suitable for use in the present compositions, including silicone resins and oils. An example of a commercially marketed agent is the substance available under the tradename "Modaflo." Coating compositions of the present invention can include about 0.5 weight percent to about 1.5 weight percent of such a flow control agent based on the weight of resin solids.

Another optional component of the coating compositions herein is a pigment material. One such preferred pigment is titanium dioxide, but any of the well known conventional pigmenting materials can be used, such as: phthalocyanine blues and greens; red, yellow, black and brown iron oxides; chrome oxide green; natural or synthetic silicas, silicates, carbonates and so forth. Sufficient pigmentation is used to provide an opaque or colored coating as needed for the desired appearance. Pigments can be employed in amounts ranging from about 1% to 60% by weight of the compositions.

The particular polyepoxide resins, aromatic ureas and condensation-type catalysts of the present invention can be formulated along with other conventional adjuncts into coating compositions in either solution or powder form. In forming solution coating compositions the hereinbefore described non-volatile composition components are combined with an appropriate solvent. The solvents which are suitable for use in the coating compositions of this invention are the usual volatile solvents used in paints and enamels. Aromatic hydrocarbons are useful, such as toluene, xylene, and aromatic petroleum cuts, e.g., Hi-Sol 4-1 (boils 190.6° C.–260.0° C.) and Solvesso 100 (boils 155.6° C.–172.2° C.). Useful ketones include methyl ethyl ketone (MEK), methyl isobutyl ketone (MIBK), methyl propyl ketone, isophorone, ethyl amyl ketone, and methyl n-amyl ketone. Alcohols are utilizable, such as butanol, amyl alcohol, 2-ethylhexanol, and cyclohexanol. Also of use are the ether alcohols and their acetate esters, such as methoxyethanol, ethoxyethanol, butoxyethanol, hexoxyethanol, methoxypropanol, methoxyethyl acetate, and ethoxyethyl acetate. It is within the contemplation of this invention to use mixtures of two or more solvents. The proportion of solvents included is not critical, since they primarily serve as the volatile vehicle to convey the solid material to the substrate to be coated. The total amount of solvents used will be sufficient to provide a solids content (% NVM) in the so-called conventional solution coating embodiment of the compositions of this invention of between about 20 weight % and about 80 weight % in the coating composition.

Powder coating compositions are especially preferred embodiments of the present invention. The powder coating embodiments of the present invention may be prepared by any process which uniformly blends the composition components. Dry blend, semi-dry blend or melt blend procedures can be employed to give a uniform blend dispersion. The uniform blend dispersion can then be pulverized to form the powder coating composition. In a preferred preparation procedure, the polyepoxide resin, aromatic urea, catalyst and other desired ingredients, such as pigments and flow control agents are dry blended in a mixer and then passed through an extruder and melt mixed. The melt mixed blend is then cooled and pulverized in a suitable milling device to a desired particle size. Particles of the powder coating compositions herein will generally range in size up to about 300 microns, more preferably from about 100 to 200 microns.

The powder coating compositions of the present invention can be applied to substrates by any desired powder coating process, although fluidized bed sintering (FBS), electrostatic powder coating (EPC) and the electrostatic fluidized bed (EFB) processes are preferred. The coating powders of the invention are especially well suited for the production of homogenous, firmly adherent coatings on substrates through coating by the fluidized bed or electrostatic spray methods.

In fluidized bed sintering (FBS) a preheated metal part is immersed into the coating powder of the invention, which is kept suspended by a gentle flow of air. The grain size of the powder generally ranges between 100 and 200 microns. The powder is suspended by blowing air through a porous bottom of a container so that it assumes a fluidized state. The pieces to be coated are preheated to 250° to 400° C. and dipped into this fluidized bed. The immersion time of the material being coated depends on the thickness of the coating that is to be produced and amounts to from 1 to 12 seconds. In general, the finished coating is prepared in a single procedure in about 3 to 7 seconds.

In the electrostatic powder coating (EPC) process, the coating powder of the invention, which normally has a grain size of under 125 microns, is blown by compressed air into the applicator where it is charged with a voltage of 30 to 100 kV by a high-voltage direct current, and sprayed onto the surface of the material to be coated. Then it is baked on at a specific temperature for specific lengths of time in suitable ovens. The powder adheres to the cold work piece due to its charge because it loses its charge slowly on account of its high electrical resistance of approximately $10^{13}$ to $10^{17}$ ohms centimeter. Alternatively, the electrostatically charged powder can also be sprayed onto a heated surface or work piece such as pipe and allowed to cure with the residual heat of the work piece or with addition of external heat.

In the electrostatic fluidized bed (EFB) process, the two procedures are combined by mounting annular or partially annular electrodes over a fluidized bed containing the powder so as to produce the electrostatic charge of, for example, 50 to 100 kV. Plates heated above the sintering temperature of the powder, at for example 250° to 400° C., are briefly dipped into the powder cloud without post-sintering, or cold or preheated plates are provided with a powder coating by electrostatic methods and the coating is fused by post-sintering at temperatures specific for the plastic powder.

Numerous substances can be coated by these powder coating methods with the preferred powders of the invention, within the limits allowed by the fusing process or the heating time, as the case may be. The preferred substrates are metals, but other materials such as glasses or ceramic articles or other heat resistant materials can be coated.

In order to more fully illustrate the nature of the invention and the manner of practicing the same, the following examples are presented.

EXAMPLE I

A flask was charged with 1386 g Versamid 140* (9.43 eq. amine at 147 eq. wt.). The charge was then heated to approximately 100° C. and 1122 g phenyl isocyanate (9.43 eq. NCO) was added slowly while holding the temperature at 100°–115° C. After the addition was complete, an infrared spectrum showed the complete reaction of isocyanate. The aromatic urea product was de-gassed under vacuum, discharged, cooled and pulverized.

*Commercially marketed polyamide prepared from diethylene triamine and mixtures of linoleic and linolenic acids.

EXAMPLE II

A flask was charged with 236.6 g Jeffamine D230* (2 eq. amine at 118.3 eq. wt.). The charge was then heated to about 100° C. and a mixture of 87 g toluene diisocyanate (1 eq. NCO) and 119 g phenyl isocyanate (1 eq. NCO) was added slowly maintaining a temperature of between 100°–130° C. The aromatic urea product was de-gassed, discharged, cooled and pulverized.

*Commercially marketed polyoxypropylene diamine.

EXAMPLES III–IV

Solution coatings using the aromatic urea curing agents of Examples I and II were prepared as follows: An epoxy resin and urea curing agent and catalyst were dissolvd in appropriate solvents. Metal test panels were coated and baked at 121° C. for 15 minutes and then tested for cure by measuring reverse impact resistance and MEK resistance. Impact resistance is determined in accordance with ASTM Designation D2794-69. MEK (methyl ethyl ketone) resistance is determined as follows: A pad of felt (2" square) soaked in MEK (methyl ethyl ketone) is rubbed back and forth across the coated surface, while the panel is resting on a firm surface. Each stroke is 2½–3" in length at a uniform pressure of about 900 grams and at a rate of about 100 rubs per minute. The pad is re-soaked with MEK after 50 double rubs, or before, if increase in friction makes it necessary. One double rub is considered as one back and forth stroke. Fifty double rubs should only slightly dull the surface in the center area of the rub. Table I gives the composition of the coatings and Table II shows the curing conditions and test results.

TABLE I

| | SOLUTION COATING COMPOSITION | | | |
|---|---|---|---|---|
| Ex. No. | Epoxy Resin DER663U (Wt. %) | Aromatic Urea (Wt. %) | Catalyst (Wt. %) | Solvent (Wt. %) |
| III | 46.1 | Ex. I - 6.8 | 1.0$^a$ | 46.1$^c$ |
| IV | 46.3 | Ex. II- 4.6 | 2.8$^b$ | 46.3$^d$ |

$^a$Hexamethylenediisocyanate - dimethylethanolamine adduct.
$^b$EPON 828 - dimethylamine adduct.
$^c$Methylethyl ketone.
$^d$Dimethylformamide.

TABLE II

| | CURE DATA | |
|---|---|---|
| Example No. | Reverse Impact (in lbs.) | MEK Resistance (Double Rubs) |
| III | 160 | 200+ |
| IV | 160 | 200+ |

EXAMPLES V–VI

Powder coatings using the urea curing agents of this invention were prepared as follows. The epoxy resin, aromatic urea curing agent, catalyst, pigments, flow control agents, etc., were pre-blended in a high intensity Welex mixer. The pre-blended materials were then melt mixed in an extruder and cooled. The cooled extrudate was pulverized in a condux mill to the required particle size (less than 200μ). Test panels were sprayed electrostatically and cured at various times and temperatures. Table III shows typical compositions and Table IV gives cure data and properties. Reverse impact and MEK resistance and 60° Gloss Value were determined for coatings cured for 30 minutes at 149° C. Gloss values are determined in accordance with ASTM standard test method D-523-67.

TABLE III

| | COATING COMPOSITIONS | | | | |
|---|---|---|---|---|---|
| Ex. No. | Wt. of Epoxy Resin DER663U | Wt. of Aromatic Urea (Example) | Wt. of Catalyst | Wt. of Moda-flow | Wt. of TiO$_2$ |
| V | 900 | Ex. I - 135 | 55.8$^a$ | 20 | 880 |
| VI | 948 | Ex. II - 93 | 58.2$^a$ | 20 | 880 |

$^a$Catalyst used was EPON 828-dimethylamine adduct.

TABLE IV

| | COATING PROPERTIES | | | | |
|---|---|---|---|---|---|
| Coating from Composition of Example No. | Geltime at 400° F. (204° C.) | Tg (°C.) | Reverse Impact (in lbs.) | MEK Resistace (Double Rubs) | Gloss 60° |
| V | 58 | 74 | 60 | 150 | 12 |
| VI | 73 | 83 | 160 | 200 | 50 |

What is claimed is:

1. A stable, heat curable coating composition consisting essentially of:
   (a) a polyepoxide having a plurality of 1,2-epoxy groups and an epoxy equivalency greater than 1.0;
   (b) an aromatic urea containing the moiety

wherein Ar is substituted or unsubstituted, mononuclear or polynuclear aromatic, said aromatic urea being present in amounts sufficient to provide an effective amount of a coreactive amine curing agent for said polyepoxide upon reaction of said aromatic urea with a portion of said polyepoxide when said composition is maintained under curing conditions which include a temperature of at least about 70° C., and
 (c) a condensation-type catalyst present in an amount effective to promote the reaction of said aromatic urea with a portion of said polyepoxide at a temperature of at least about 70° C.;
said composition being substantially free of coreactive amounts of amine and polycarboxylic acid anhydride curing agents at temperatures below about 70° C.

2. A composition according to claim 1 wherein the polyepoxide is selected from the group consisting of:
 (a) epoxy polyethers which are the reaction products of epihalohydrin and polyhydric phenols or polyhydric alcohols;
 (b) polyepoxypolyhydroxy poyethers which are the reaction products of polyepoxides and polyhydric phenols;
 (c) epoxy novolac resins which are the reaction products of epihalohydrin and the resinous condensates of an aldehyde and a mono- or polyhydric phenol;
 (d) polymers of epoxy-containing monomers which also contain at least one polymerizable double bond; and
 (e) epoxy-terminated polyoxazolidones which are the reaction products of diepoxides and diisocyanates.

3. A composition according to claim 1 wherein the polyepoxide is a glycidyl ether of bisphenol A.

4. A composition according to claim 2 wherein the aromatic urea is the reaction product of an isocyanate and a primary or secondary amine or a mixture of primary and secondary amines.

5. A composition according to claim 4 wherein the isocyanate is selected from phenyl isocyanate, tolylene diisocyanates, hexamethylene diisocyanate, methylene bis(phenol isocyanates) and mixtures thereof, and wherein the amine is selected from aliphatic primary and secondary monoamines, aromatic amines, alkylene diamines, polyalkylene polyamines, polyamides and polyamidoamines.

6. A composition according to claim 2 wherein the condensation-type catalyst is selected from quaternary ammonium halides, and tertiary amines.

7. A composition according to claim 2 wherein said composition additionally contains an adjuvant selected from pigments, flow control agents and mixtures of pigments and flow control agents.

8. A stable, heat curable coating composition solution consisting essentially of a solvent and from about 20% to 80% by weight of non-volatile material which consists essentially of:
 (a) from about 70% to 99% by weight of organic solids in the non-volatile material of a polyepoxide having a plurality of 1,2-epoxy groups and an epoxy equivalency greater than 1.0;
 (b) an aromatic urea containing the moiety

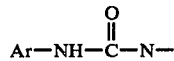

wherein Ar is substituted or unsubstituted, mononuclear or polynuclear aromatic, said aromatic urea being present in an amount sufficient to provide a ratio of equivalents of epoxide from the polyepoxide to equivalents of urea plus amine functionality from the urea of from about 0.2:1 to 2:1, and
 (c) a condensation-type catalyst suitable for promoting the reaction of said aromatic urea with a portion of said polyepoxide at a temperature of at least 70° C., said addition polymerization catalyst being present in an amount of from about 0.1% to 10% by weight of said polyepoxide and said aromatic urea;
said composition being substantially free of coreactive amounts of amine and polycarboxylic acid anhydride curing agents at temperatures below about 70° C.

9. A composition according to claim 8 wherein the polyepoxide is selected from the group consisting of:
 (a) epoxy polyethers which are the reaction products of epihalohydrin and polyhydric phenols or polyhydric alcohols;
 (b) polyepoxypolyhydroxy polyethers which are the reaction products of polyepoxides and polyhydric phenols;
 (c) epoxy novolac resins which are the reaction products of epihalohydrin and the resinous condensates of an aldehyde and a mono- or polyhydric phenol;
 (d) polymers of epoxy-containing monomers which also contain at least one polymerizable double bond; and
 (e) epoxy-terminated polyoxazolidones which are the reaction products of diepoxides and diisocyanates.

10. A composition according to claim 8 wherein the polyepoxide is a glycidyl ether of bisphenol A.

11. A composition according to claim 8 wherein the aromatic urea is the reaction product of an isocyanate and a primary or secondary amine or mixtures of primary and secondary amines.

12. A composition according to claim 11 wherein the isocyanate is selected from phenyl isocyanate, tolylene diisocyanates, hexamethylene diisocyanate, methylene bis(phenol isocyanates) and mixtures thereof, and wherein the amine is selected from aliphatic primary and secondary monoamines, aromatic amines, alkylene diamines, polyalkylene polyamines, polyamides and polyamidoamines.

13. A composition according to claim 8 wherein the condensation-type catalyst is selected from quaternary ammonium halides and tertiary amines.

14. A composition according to claim 8 wherein said composition additionally contains an adjuvant selected from pigments, flow control agents and mixtures of pigments and flow control agents.

15. A composition according to claim 8 wherein the solvent is selected from aromatic hydrocarbons, ketones, alcohols, ether alcohols and the acetate esters thereof and mixtures of these solvent types, and wherein the non-volatile material comprises from about 20% to 80% by weight of the composition.

16. A thermosetting polymer powder coating composition comprising finely divided particles having a particle size of up to about 300 microns, said composition consisting essentially of:

(a) from about 70% to 99% by weight of organic solids of a polyepoxide having a plurality of 1,2-epoxy groups and an epoxy equivalency greater than 1.0;
(b) an aromatic urea containing the moiety

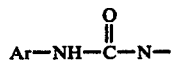

wherein Ar is substituted or unsubstituted, mononuclear or polynuclear aromatic, said aromatic urea being present in an amount sufficient to provide a ratio of equivalents of epoxide from the polyepoxide to equivalents of urea plus amine functionality from the urea of from about 0.2:1 to 2:1; and
(c) a condensation-type catalyst suitable for promoting the reaction of said aromatic urea with a portion of said polyepoxide at a temperature of at least 70° C., said condensation-type catalyst being present in an amount of from about 0.1% to 10% by weight of said polyepoxide and said aromatic urea; said composition being substantially free of coreactive amounts of amine and polycarboxylic acid anhydride curing agents at temperatures below about 75° C.

17. A composition according to claim 16 wherein the polyepoxide is selected from the group consisting of:
(a) epoxy polyethers which are the reaction products of epihalohydrin and polyhydric phenols or polyhydric alcohols;
(b) polyepoxypolyhydroxy polyethers which are the reaction products of polyepoxides and polyhydric phenols;
(c) epoxy novolac resins which are the reaction products of epihalohydrin and the resinous condensates of an aldehyde and a mono- or polyhydric phenol;
(d) polymers of epoxy-containing monomers which also contain at least one polymerizable double bond; and
(e) epoxy-terminated polyoxazolidones which are the reaction products of diepoxides and diisocyanates.

18. A composition according to claim 16 wherein the polyepoxide is a glycidyl ether of bisphenol A.

19. A composition according to claim 16 wherein the aromatic urea is the reaction product of an isocyanate and a primary or secondary amine or mixtures of primary and secondary amines.

20. A composition according to claim 19 wherein the isocyanate is selected from phenyl isocyanate, tolylene diisocyanates, hexamethylene diisocyanate, methylene bis(phenol isocyanates) and mixtures thereof, and wherein the amine is selected from aliphatic primary and secondary monoamines, aromatic amines, alkylene diamines, polyalkylene polyamines, polyamides and polyamidoamines.

21. A composition according to claim 16 wherein the addition polymerization catalyst is selected from quaternary ammonium halides, and tertiary amines.

22. A composition according to claim 16 wherein said composition additionally contains an adjuvant selected from pigments, flow control agents and mixtures of pigments and flow control agents.

23. A substrate having a coating of the cured composition of claim 1.

24. A substrate having a coating of the cured composition of claim 8.

25. A substrate having a coating of the cured composition of claim 16.

* * * * *